United States Patent [19]

Harmsen

[11] Patent Number: 4,559,904
[45] Date of Patent: Dec. 24, 1985

[54] FEEDING BOX

[75] Inventor: Jan H. Harmsen, BJ Hengelo, Netherlands

[73] Assignee: N.V. Nederlandsche Apparatenfabriek Nedap, De Groenlo, Netherlands

[21] Appl. No.: 495,866

[22] Filed: May 18, 1983

[30] Foreign Application Priority Data

May 18, 1982 [NL] Netherlands ................ 8202053
May 19, 1982 [NL] Netherlands ................ 8202086

[51] Int. Cl.⁴ ............................................. A01K 5/02
[52] U.S. Cl. ................................................. 119/51 R
[58] Field of Search .......... 119/51 R, 52 R, 52 AF, 119/52 B, 53.5, 54, 61, 27, 155, 55; 49/236, 237, 46, 49

[56] References Cited

U.S. PATENT DOCUMENTS

| | | | |
|---|---|---|---|
| 3,222,806 | 12/1965 | Martin | 49/237 |
| 3,850,145 | 11/1974 | Yoder et al. | 119/51 R |
| 4,026,069 | 5/1977 | Bohnett | 49/237 |
| 4,145,994 | 3/1979 | Miller | 119/155 |
| 4,162,683 | 7/1979 | Brooks | 119/51 R |
| 4,261,297 | 4/1981 | Van Maarion et al. | 119/155 |
| 4,328,643 | 5/1982 | Bell | 119/155 |

FOREIGN PATENT DOCUMENTS

| | | | |
|---|---|---|---|
| 894575 | 3/1972 | Canada . | |
| 930630 | 7/1973 | Canada . | |
| 3024692 | 1/1982 | Fed. Rep. of Germany | 119/52 AF |
| 7900426 | 7/1980 | Netherlands | 119/27 |
| 1424330 | 2/1976 | United Kingdom | 49/49 |

Primary Examiner—Hugh R. Chamblee
Attorney, Agent, or Firm—Fleit, Jacobson, Cohn & Price

[57] ABSTRACT

A feeding box for cattle, in particular pigs, comprising a space enclosed by four upright walls, a fodder dispenser in said box or in one of the walls of the box, one of said walls having an access opening therein. The opening includes closure means lockable by means responsive to the presence in said box of a selected one of the cattle, and included in a control circuit also including the dosing motor of said fodder dispenser. It is also possible that the wall opposite to the wall containing the fodder dispenser has two openings, each of which includes said closure means, and in which case a partition gate in the box is arranged for rotation about a shaft disposed in the boundary plane between the two gates.

5 Claims, 6 Drawing Figures

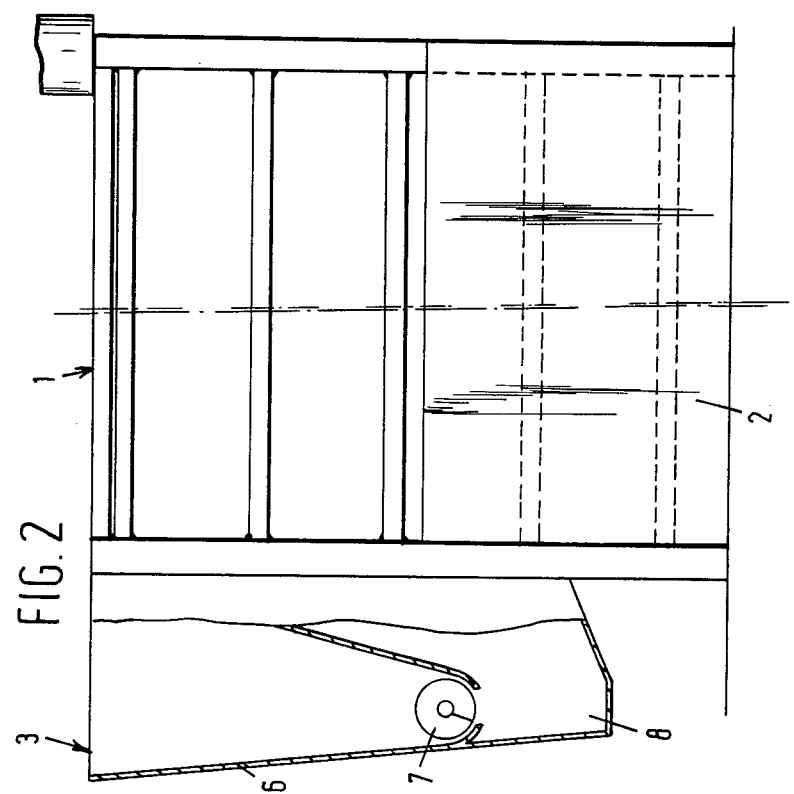
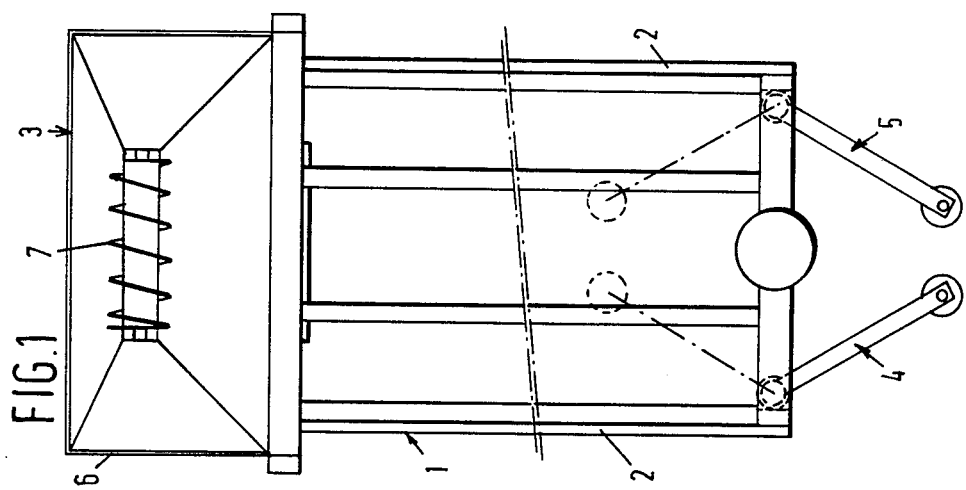

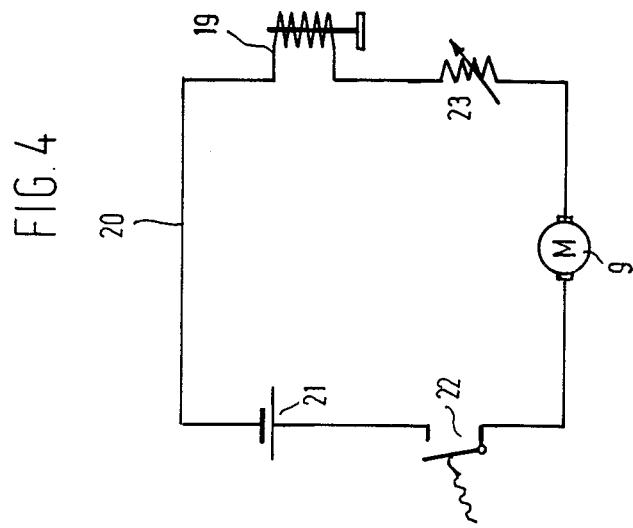
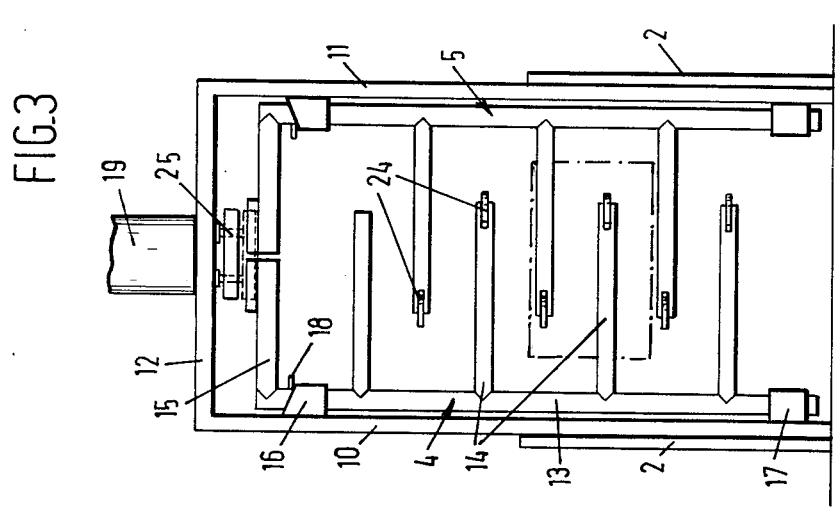

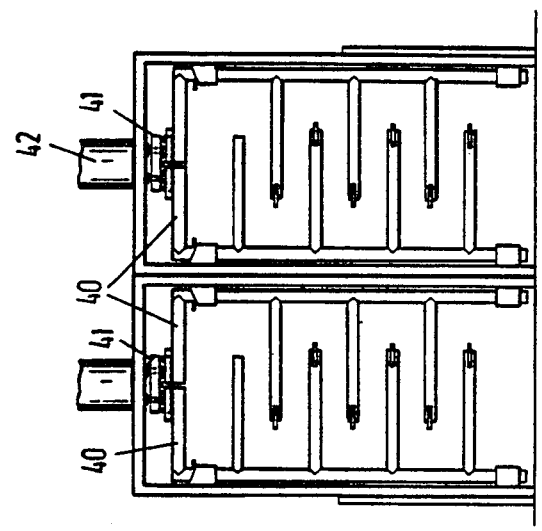
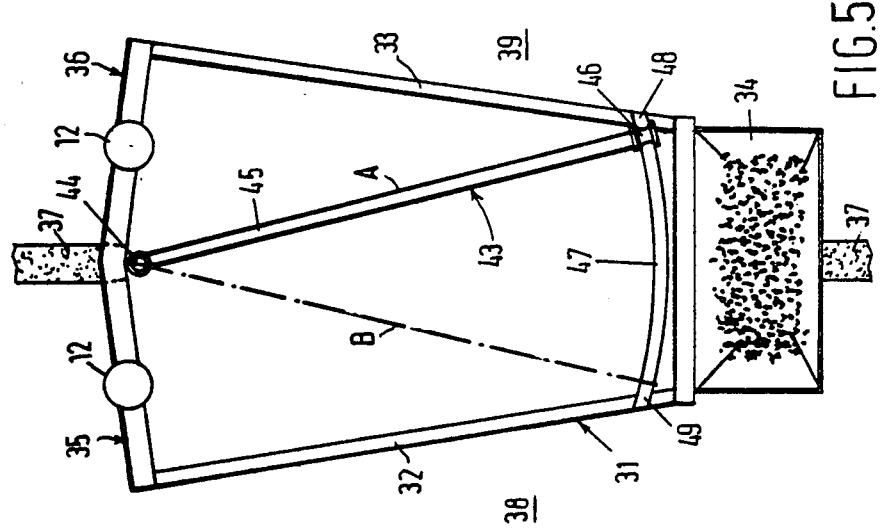

FEEDING BOX

This invention relates to a feeding box for cattle, in particular pigs.

It is known that during feeding, animals try to push the others aside from the place where the fodder is present.

It is an object of the present invention to provide a feeding box designed so as to remove this disadvantage. For this purpose, the invention provides a feeding box for cattle, in particular pigs, comprising a space enclosed by four upright walls, a fodder dispenser in said box or in one of the walls of the box, one of said walls having an access opening therein, said opening including closure means lockable by means responsive to the presence in said box of a selected one of the cattle. In other words, as soon as a pig is present in the box, the box is closed, so that the pig may eat without being disturbed.

In one embodiment of the invention, the fodder dispenser includes a dosing motor included in a control circuit which also includes said locking means. Owing to these features, it is achieved that fodder is not supplied until after the access opening is locked.

The access opening may be provided with at least one door composed of pipe lengths and suspended on one side, said locking means including a magnetically operable latch included in said control circuit. This provides for a simple construction.

In a further elaboration of the invention, the door comprises suspension hooks arranged to cooperate with eyes secured to said access opening, and the tops of the eyes on which the suspension hooks are supported have a profile curved so that the door will always be automatically moved to its closed position by gravity.

In a further embodiment according to the invention, the side of the door opposite the hinging edge is provided with rollers, by virtue of which a pig may easily pass the door, even if, after having entered the box halfway, the pig tries to leave it again.

In a preferred embodiment of the invention, the access opening is equipped with a door consisting of two members, each essentially consisting of at least one vertical pipe, a plurality of horizontal pipes secured to said vertical pipe and carrying rollers at their free ends, possibly except for the uppermost pipe, and which members are suspended in an access opening. Such a construction has proved in practice to be very suitable, especially when, in a further elaboration of the invention, the horizontal pipes of the two door members, possibly except for the uppermost ones, extend in mounted condition each beyond the other door half.

The top of the access opening may be closed with a cross-beam mounting said magnet capable of controlling said latch, said latch being arranged to engage around the uppermost pipes of the door or door members in its, or their, closed position.

It has been found that in the case of cattle, in particular pigs, depending on the species, there is an ideal number per stall. In the case of sows, for example, this is 12. Now, a box with a fodder dispenser is capable of feeding at least twice the said ideal number of pigs. Consequently it is also an object of the present invention to provide a feeding box with which cattle present in two different stalls or stables can be fed without being pushed aside.

For this purpose the invention provides a feeding box for cattle, in particular for pigs, comprising a space enclosed by four upright walls, a fodder dispenser in one of the walls of the box, the opposite wall having two openings therein, each closable by a gate, and a partition gate in said box arranged for rotation about a shaft disposed in the boundary plane between the two gates. When a pig enters the box through one gate, it will displace the partition gate in such a manner that a pig entering through the other gate is unable to reach the fodder dispenser.

In an embodiment of the invention, the partition gate actuates a switch in each end position, said switch being included in a control circuit which also includes means for controlling latch means for locking said two gates, said control circuit being arranged to be actuated by a selected one of said cattle. It is thus achieved that when once a pig has arrived in the feeding box, both gates are locked, so that the selected one of the animals may eat without being disturbed. It is observed in this connection that a selected one of the animals means the animals still entitled to one or more portions of fodder.

In a further elaboration of this embodiment, the partition gate includes at least one vertical pipe and at least one horizontal pipe secured to said vertical pipe, said horizontal pipe having a free end guided over a support rail or guide rail provided across the box. In this arrangement the free end of the horizontal pipe may be provided with a roller arranged to cooperate with said guide rail, said rail being a curved pipe.

Two embodiments of the invention will now be described, by way of example, with reference to the accompanying drawings, in which:

FIG. 1 shows a top plan view of a feeding box according to the invention;

FIG. 2 shows a side-elevational view, partly in section, of the feeding box illustrated in FIG. 1;

FIG. 3 shows a rear elevational view of the feeding box of FIG. 1;

FIG. 4 shows a diagram of the electrical circuit used in the apparatus shown in FIGS. 1–3.

FIG. 5 shows a top plan view of a feeding box built in a partition wall between two pigsties, and FIG. 6 shows a rear elevational view of the apparatus shown in FIG. 5.

Referring to the drawings, there is shown a feeding box 1 comprising sidewalls 2 composed of metal pipes, a front wall equipped with a fodder dispenser 3, and a rear wall with a door consisting of two members 4,5.

The fodder dispenser may be of the kind as described, for example, in applicants' Netherlands patent applications Nos. 7609780 (meanwhile Netherlands Pat. No. 162,821), 7908442 and 8003014. In this construction the fodder dispenser comprises a housing 6 in which a dosing worm 7 is arranged, through which fodder can be supplied to the bottom portion of the fodder dispenser, which forms a trough 8. The dosing worm 8 can be driven by a motor 9, included in the electrical circuit 20 shown in FIG. 4.

The rear of the feeding box has an access opening formed by two uprights 10, 11 and a horizontal beam or lintel 12, which can be closed by the door members 4 and 5 referred to.

Door members 4, 5 each consist of a vertical pipe 13 and a plurality of horizontal pipes 14, and a horizontal uppermost pipe 15. The vertical pipe is received in hinge eyes 16, 17, respectively secured to the uprights 10 and 11.

As shown in FIG. 3, uprights 10 and 11 each include a pin 18 cooperating with the upper edge of eye 16, 17. This upper edge is so curved or bevelled that the door half concerned automatically returns into its closed position after being opening. In this closed position the two door-halves can be locked by a latch 25 engaging around the two pipes 15, which latch can be operated by an electromagnet 19 included in the electrical circuit 20 referred to.

The electrical circuit furthermore includes, in addition to a source of current 21, a magnet switch 22 arranged adjacent to the fodder dispenser, which switch is responsive to a chain or the like carried around the neck by a selected one of the cattle and also a time relay 23.

As further shown in the drawings, the horizontal pipes 14 of the door members 4,5 are each provided with a roller 24, by virtue of which an animal can easily pass the door. This latter is improved still further by virtue of the pipes 14 of each door member extending each beyond the other door member.

The operation of the apparatus will be clear:

After the passage of an animal, when the animal is adjacent to the fodder dispenser, the magnet switch 22 will be operated, owing to which motor 9, magnet 19 and also relay 23 will be energized. As a result, fodder will be supplied to the trough portion, while owing to magnet 19 being energized, the access opening of the box is locked, so that the animal in question can eat without being disturbed. After a pre-determined time, the current circuit will be de-energized under the influence of time relay 23, owing to which the access opening is unlocked, and the animal can leave the box.

Referring to the FIGS. 5 and 6, there is shown a feeding box 31 comprising two upright side walls 32, 33. The front wall of the box is provided with a fodder dispenser 34, and the opposite rear wall has two access openings, each closable by a gate 35, 36, respectively.

As shown in FIG. 5, the feeding box is mounted in a partition wall 37 between two stalls or stables 38, 39.

Gates 35 and 36 are each constructed in the manner as described with reference to the FIGS. 1–4 and will therefore not be described in any detail now. The upper two tubes 40 of the gates can each cooperate with a latch 41. This latch 41 is actuated by an electrically operable lifting magnet 42, included in a control circuit not shown.

Arranged within the double feeding box 31 is a pivoting partition gate 43, consisting of a vertical pipe 44 arranged in the plane of the partition wall 37, and at least one horizontal pipe 45 connected to the vertical pipe 44, and whose length is approximately equal to the longitudinal extent of the feeding box 31. The partition gate 43 may of course include two or more spaced parallel horizontal pipes 45. Provided at the end of the horizontal pipe, or the upper or uppermost horizontal pipe, is a roller 46, arranged to travel over a curved guide rail 47. The partition 43 is arranged for pivoting movement between two end positions A and B, and in each position A or B actuates an end switch 48, 49 to indicate that gate 43 has arrived in one of its end positions. End switches 48 and 49 are included, along with the electrically operable lifting magnets for gates 35, 36 in the control circuit. As soon as one of the end switches 48, 49 is actuated by gate 43, the two gates 35, 36 are closed owing to latch 41, via lifting magnet 42, being shifted over the upper horizontal pipes 40 of the two gates 35, 36.

In this way, one and the same feeding box can be used for feeding, for example, pigs held in two separate sties 38 and 39. After the feeding of, for example, one pig from sty 38, the latches 41 of the two gates 35, 36 are released, so that the pig may leave box 31 through gate 35. A pig which then enters the feeding box via gate 36 causes gate 43 to pivot into position B, thereby actuating end switch 49, which in turn results in gates 35, 36 being again locked by the latch.

It will be clear that a large number of modifications and changes can be made without departing from the scope of the invention.

What I claim is:

1. A feeding box for animals, said feeding box comprising:
    a plurality of upright walls,
    an access opening for a fodder dispenser, said access opening being located in one of said plurality of upright walls,
    a gate assembly defining an enclosed space with said plurality of upright walls, said gate assembly including two sets of gate means, each of said two sets of gate means being pivotably mounted on one of said plurality of upright walls to allow entrance and exit of an animal to and from said enclosed space,
    a partition gate located in said enclosed space, one end of said partition gate being pivotably mounted about a vertical pivot member mounted adjacent to and centrally between said two sets of gate means and an end of said partition gate, opposed to said one end being swung through an arc of rotation passing in front of said access opening, said partition gate being pivoted about said one end to move said opposed end of said partition gate between two positions spaced along said arc of rotation,
    a first switch being located at one of said two positions and a second switch being located at the other of said two positions, one of said first switch and said second switch being actuated by said partition gate when said opposed end is swung through said arc of rotation,
    latch means for locking each of said two sets of gate means, and
    control means for actuating said fodder dispenser, said control means including switch means for actuating said control means when one of said first switch and said second switch are actuated by said partition gate, and actuating means for an animal to actuate said switch means when an animal is proxmite to said switch means, said control means controlling said latch means to lock one of said two sets of gate means so that an animal in said enclosed space may eat without being disturbed.

2. A feeding box according to claim 1, wherein the partition gate includes at least one vertical pipe and at least one horizontal pipe secured to said vertical pipe, said horizontal pipe having a free end guided over a guide rail extending across the box.

3. A feeding box according to claim 2, wherein the free end of the horizontal pipe includes a roller cooperating with said guide rail, said guide rail being a curved pipe.

4. A feeding box for animals, said feeding box comprising:
    a plurality of upright walls;

an access opening for a fodder dispenser, said access opening being located in one of the plurality of said upright walls;

a gate assembly defining an enclosed space with said plurality of upright walls, said gate assembly including gate means pivotably mounted on one of said plurality of upright walls for movement between a rest position, an inwardly extending position where one end of said gate means extends into said enclosed spaced and an outwardly extending position where said one end of said gate means extends outwardly from said enclosed space;

closure means for locking and unlocking said gate means when said gate means is in said rest position; and control means for actuating said fodder dispenser, said control means including switch means for actuating said control means and actuating means for an animal to actuate said switch means when an animal is proximate to said switch means, said control means locking said gate means in said rest position in response to an animal in said enclosed space actuating said switch means after the animal has pushed said gate to said inwardly extending position and said gate has returned to said rest position so that the animal may eat without being disturbed, said control means unlocking said gate means after said animal has been in said enclosed space for a predetermined length of time to allow said animal to push said gate to said outwardly extending position so that said animal is able to leave said enclosed space.

5. A feeding box for animals as claimed in claim 4, wherein said closure means includes a magnetically openable latch for locking said gate means in said rest position.

* * * * *